(12) United States Patent
Steadman

(10) Patent No.: US 6,612,071 B1
(45) Date of Patent: Sep. 2, 2003

(54) SUPPORT APPARATUS

(75) Inventor: William David Steadman, Port Saint Lucie, FL (US)

(73) Assignee: William Steadman, Port Saint Lucie, FL (US)

( * ) Notice: Subject to any disclaimer, the term of this patent is extended or adjusted under 35 U.S.C. 154(b) by 0 days.

(21) Appl. No.: 09/763,997

(22) PCT Filed: Sep. 3, 1999

(86) PCT No.: PCT/GB99/02928

§ 371 (c)(1),
(2), (4) Date: Feb. 26, 2001

(87) PCT Pub. No.: WO00/13484

PCT Pub. Date: Mar. 16, 2000

Related U.S. Application Data

(60) Provisional application No. 60/099,411, filed on Sep. 8, 1998.

(51) Int. Cl.[7] ............................................... A01G 17/04
(52) U.S. Cl. ............................................. 47/42; 248/525
(58) Field of Search ............................... 47/42, 43, 47; 148/534, 535, 524, 525; 24/298, 302

(56) References Cited

U.S. PATENT DOCUMENTS

| | | | |
|---|---|---|---|
| 1,560,404 A | * 11/1925 | Brown | ...................... 248/156 |
| 2,501,255 A | 3/1950 | Bell | |
| 4,088,294 A | * 5/1978 | Aliment et al. | ............. 248/247 |
| D260,960 S | * 9/1981 | Malia, Jr. | ........................ D8/1 |
| 4,848,027 A | * 7/1989 | Skierwiderski | ............. 248/523 |
| 5,159,780 A | 11/1992 | Molthen | |
| 5,340,066 A | * 8/1994 | Ditch | .......................... 248/170 |
| 5,465,529 A | * 11/1995 | Park | ............................ 47/40.5 |
| 5,577,701 A | 11/1996 | Plzak | |
| 5,950,359 A | * 9/1999 | Pivnik | ............................ 47/42 |
| 6,155,529 A | * 12/2000 | De Carlo | .................... 248/519 |
| 6,370,817 B1 | * 4/2002 | Brooks et al. | ................. 24/19 |
| 6,389,743 B1 | * 5/2002 | Stephenson | .................... 47/43 |

FOREIGN PATENT DOCUMENTS

| | | |
|---|---|---|
| DE | 3810570 A | 10/1989 |
| GB | 2307170 A | 5/1997 |
| JP | 9-191775 | * 7/1997 |

* cited by examiner

*Primary Examiner*—Peter M. Poon
*Assistant Examiner*—Jeffrey Gellner
(74) *Attorney, Agent, or Firm*—Watts, Hoffman, Fisher & Heinke Co., L.P.A.

(57) ABSTRACT

A support apparatus (10) for trees (12) comprising a mounting part (14) in the form of a plurality of brackets (16) interconnected by ties (24), engageable around the tree (12), and a ground engaging member (32) extendible from each bracket (16) at an inclination to the tree (12).

14 Claims, 3 Drawing Sheets

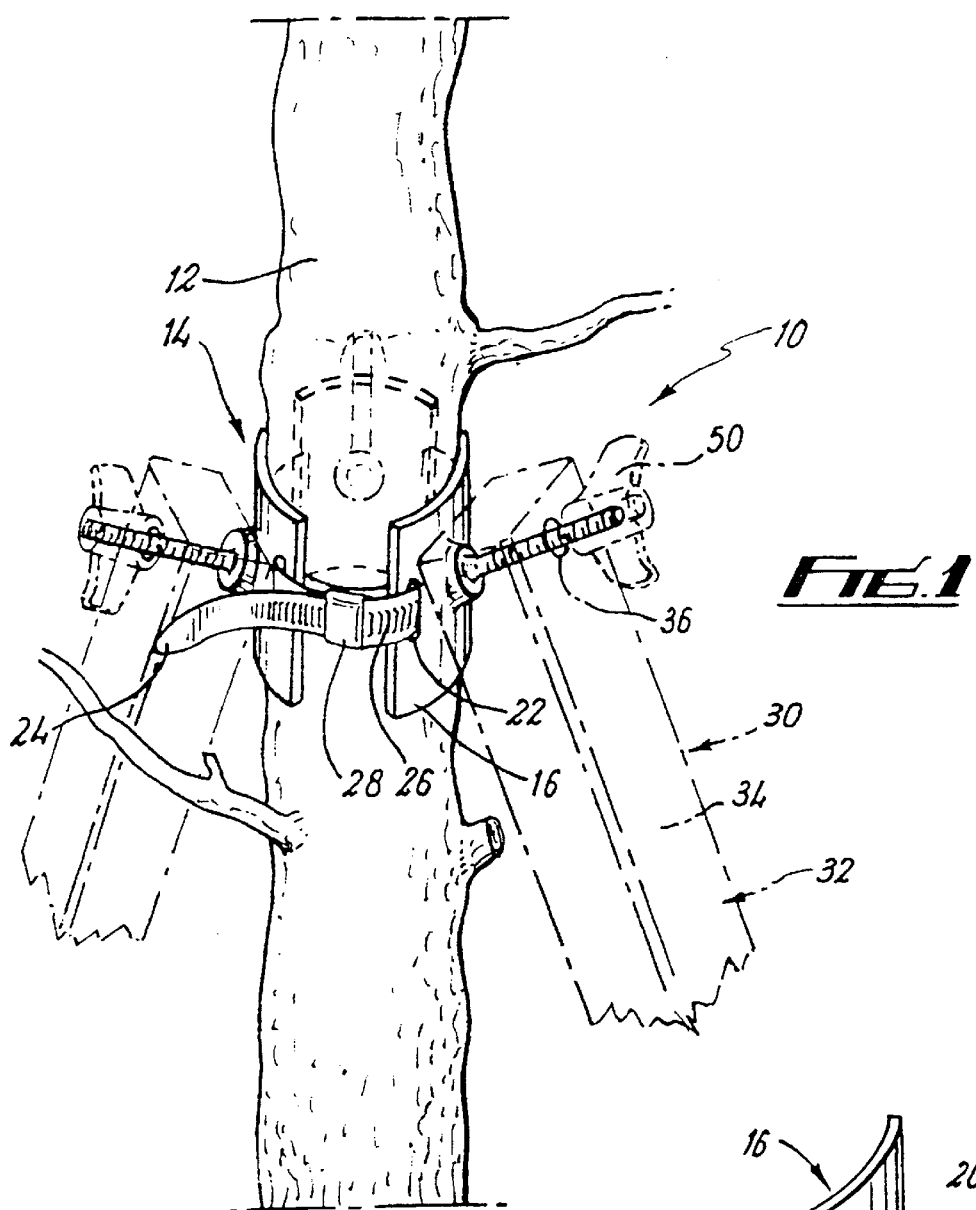
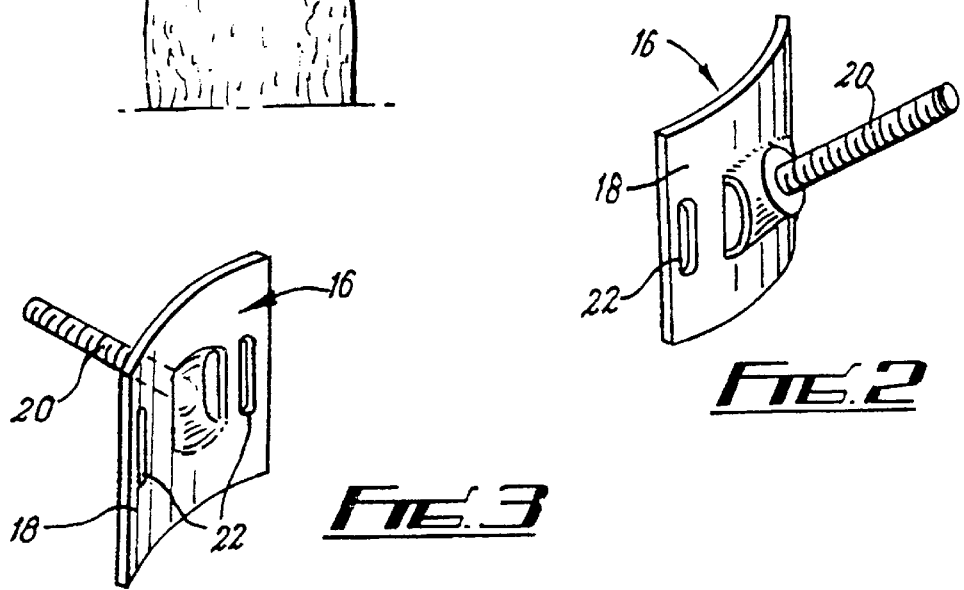

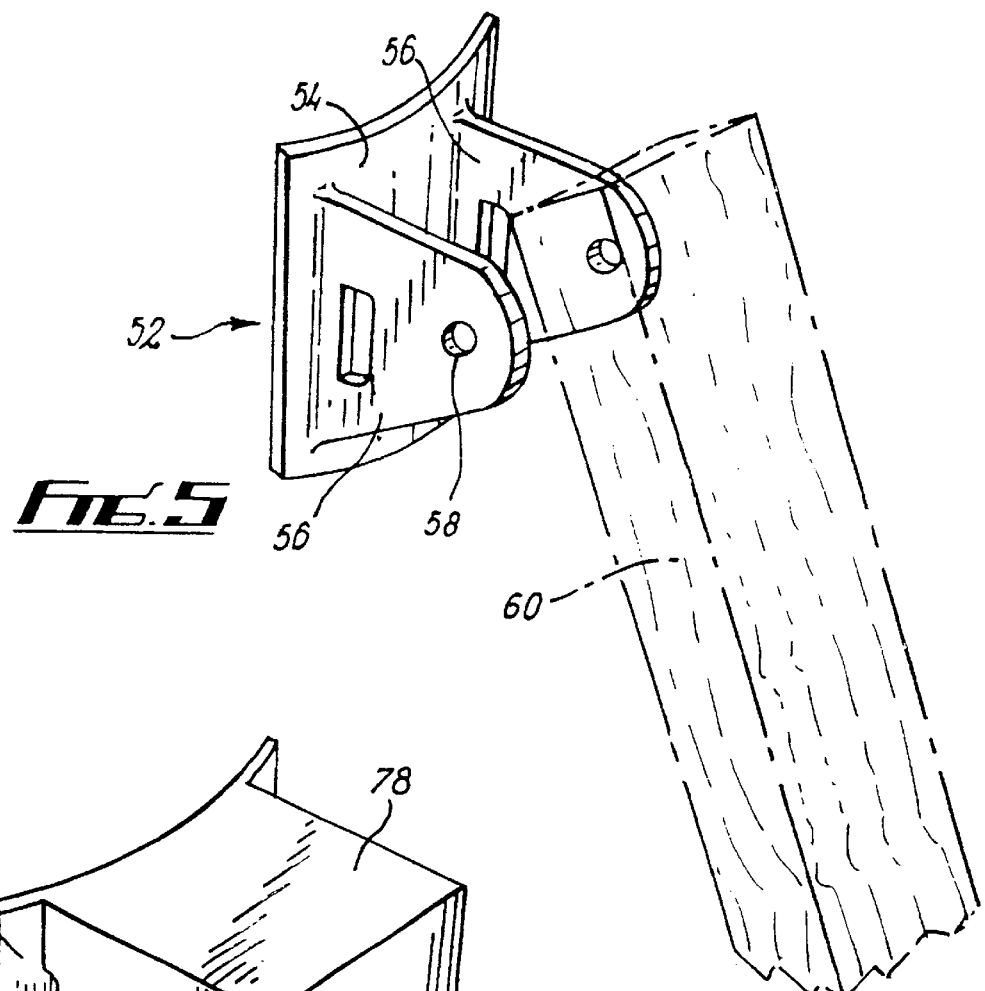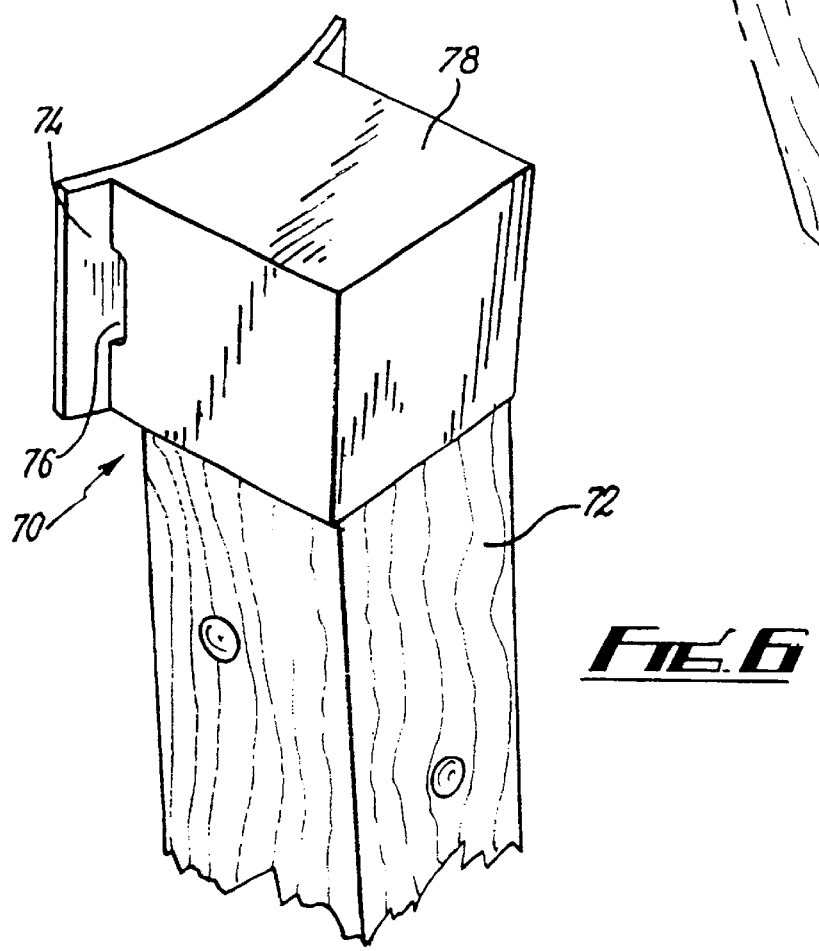

SUPPORT APPARATUS

This application claims the benefit of Provisional application Ser. No. 60/099,411, filed Sep. 3, 1998.

This invention relates to support apparatus, and particularly but not exclusively support apparatus for trees, plants or other upstanding items.

Conventionally trees and other tall plants are supported by the use of a single stake inserted in the ground next thereto, and to which the tree or plant is tied. This arrangement is often not wholly satisfactory, and difficulties can often be encountered when knocking the stake into the ground, particularly as it is immediately adjacent the tree or plant.

According to the present invention there is provided a support apparatus for an upstanding item, the apparatus comprising a mounting part engageable around the item at a point thereon spaced above the ground, and a supporting part in the form of a plurality of substantially rigid ground engaging elongate members extendible from the mounting part at spaced locations and inclined relative to the item, to engage with the ground and thereby support the upstanding item.

The mounting part may comprise a plurality of mounting members interconnected by one or more variable length members to permit mounting around different size items.

The interconnecting members may comprise ties, which ties may automatically lock tight. Alternatively the interconnecting members may comprise a strap or straps.

A mounting member may be provided for each elongate member. Each elongate member may be pivotally mountable on a respective mounting member. Each elongate member may be removably mountable on a respective mounting member. A projection may be provided on the mounting part for each elongate member, with the projection engageable through an opening in the respective elongate member. The projection may be threaded and a threaded member may be engageable therewith to hold the respective elongate member thereon. The threaded member may comprise a wing nut.

Each mounting member may comprise a housing with an in use generally downward facing opening, in which opening an end of a respective elongate member is locatable. The housings may be of circular or rectangular cross-section.

The mounting members may be slidably mounted on the interconnecting members or member. The mounting members may comprise one or more openings or a sleeve arrangement through which the interconnecting members or member extend.

Three elongate members may be provided. The elongate members may be variable in length and may be telescopic. A plurality of holes may be provided in one part of the elongate members alignable with a hole in another part of the elongate members, with locking means engageable in the aligned holes.

A pointed part or similar may be provided at the lower end of the elongate members to be ground engageable.

Embodiments of the present invention will now be described by way of example only and with reference to the accompanying drawings, in which:

FIG. 1 is a diagrammatic perspective view of part of a first support apparatus according to the invention in use;

FIGS. 2 and 3 are respectively diagrammatic front and rear perspective views of part of the apparatus of FIG. 1;

FIG. 5 is a diagrammatic perspective view of part of a second apparatus according to the invention; and FIG. 6 is a diagrammatic perspective view of part of a third apparatus according to the invention.

Figure 4:
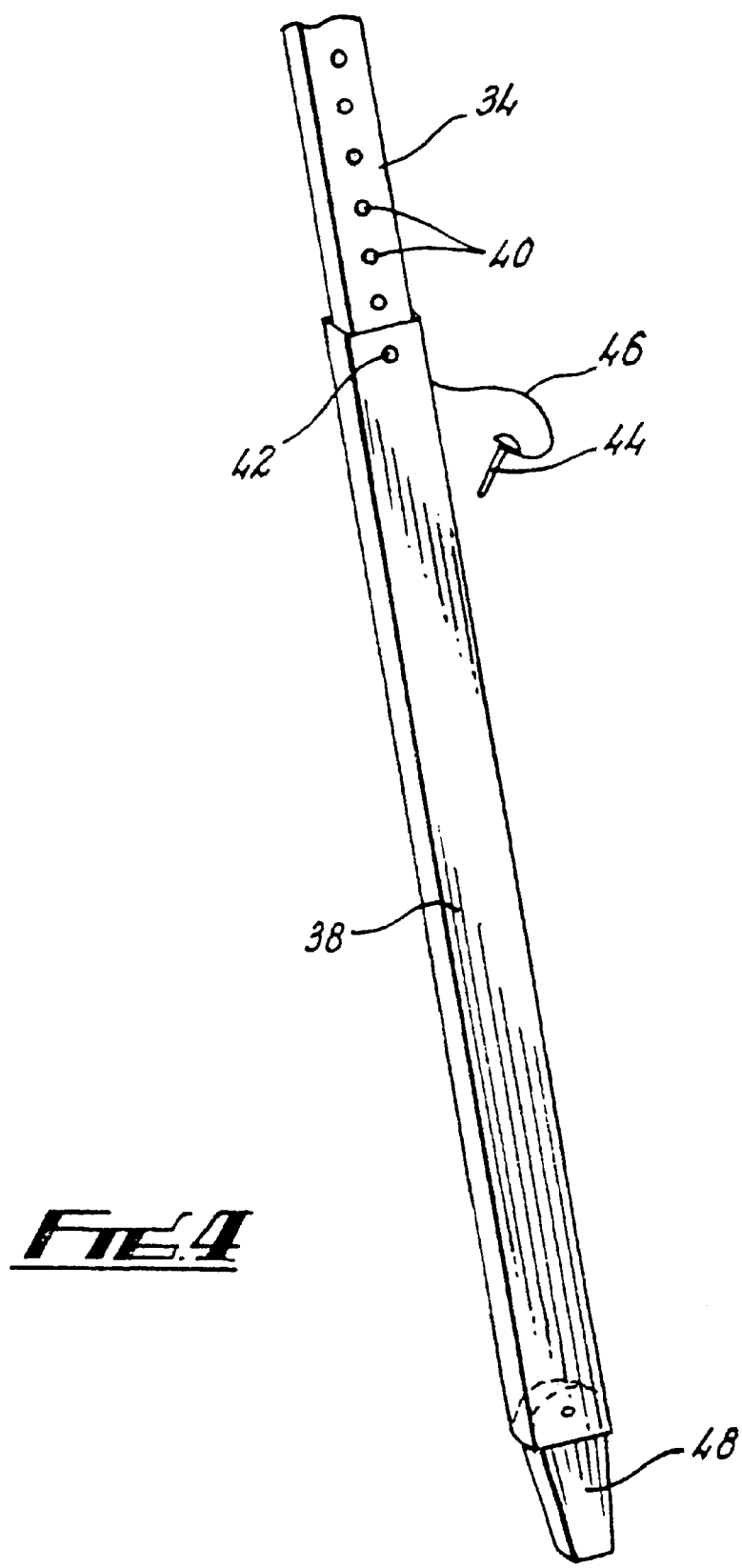
FIG. 4 is a diagrammatic perspective view of a further part of the apparatus of FIG. 1.

FIGS. 1 to 4 show support apparatus 10 suitable for supporting an upstanding item such as a tree 12. The apparatus 10 comprises a mounting part 14 in the form of three identical brackets 16. Each bracket 16 comprises an arcuate section plate 18 from which a threaded projection 20 extends at an upwards inclination in use. Holes 22 are provided on each side of the projection 20.

The part 14 also comprises three ties 24 for connecting the brackets 16 together in a loop around the tree 12. The ties 24 are of the type with a plurality of indents 26 in which a projection (not shown) located in a sleeve 28 automatically locates such that when the ties 24 are pulled tight they automatically lock in position.

The apparatus 10 also comprises a supporting part 30 in the form of three elongate members 32. The members 32 comprise a top bar 34 with an opening 36 adjacent the top end thereof through which a one of the projections 20 can extend in use. The members 32 also comprise a square section tube 38 from which the bar 34 telescopically extends. A plurality of spaced holes 40 are provided towards the lower end of the bar 34 and alignable with a hole 42 towards the top of the tube 38. A pin 44 is mounted near the top of the tube 38 by a cord 46, and is locatable through the holes 40, 42 when aligned to lock the bar 34 in position. A pointed foot 48 is provided at the lower end of the tube 30 to be ground engageable.

In use the tree 12 is supported by the three elongate members 32 as shown, with the projections 20 extending through the openings 36, with the projections 20 held in position by wing nuts 50 threadedly engaging thereon. The tubes 38 can readily be inserted into the ground at required positions clear from the tree 12, and the position of the bars 34 adjusted telescopically.

FIG. 5 shows a further similar apparatus 52. In this instance rather than providing a projection on the mounting part, this part comprises brackets 54 each with a pair of spaced lugs 56 with holes 58 towards the end thereof. The elongate members 60 can be mounted on the brackets 54 by hammering nails through the respective holes 58 to engage thereinto. Alternatively, if a transverse hole is provided through the top of the members 60 a pin or other member can be located extending therethrough.

FIG. 6 shows an alternative similar apparatus 70. In this embodiment each mounting member comprises a bracket 74 which comprises a substantially square housing 78 with an opening facing the ground. The housing 78 slides over the upper end of the elongate member 72. The bracket is further provided with openings 76 one on each side of the housing 78 to locate the ties or for straps to extend through to connect the brackets together in a loop around a tree. The bracket 74 and the housing 78 are integrally formed.

There is thus described support apparatus for trees, other plants or other upstanding items. The apparatus is of relatively straightforward construction and can thus be inexpensively and robustly manufactured. As the elongate members are inclined relative to the upstanding item it is much easier for them to be inserted in the ground. The telescopic nature of the elongate members allows the mounting part to be provided at an appropriate place on the article.

The third apparatus comprising the housing has the advantage that it covers the bare end of the elongate member and prevents rain from penetrating the wood. This apparatus is particularly suited for mass production as it could be moulded out of the same material.

Various modifications may be made without departing from the scope of the invention. For example, the mounting brackets may be differently formed and could be held on the upstanding item other than by the ties. For instance, straps could be used. The elongate members could be mounted on the brackets by a different means. The elongate members could comprise more than two components and a different telescopic arrangement may be provided such as one which provides for infinite adjustment with for instance a locking screw. A different number of elongate members could be provided.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A support apparatus for an upstanding planting comprising;
    a) mounting mechanism for snugly surrounding a trunk of a planting, the mechanism including a plurality of mounting brackets and an elongate tie for surrounding a planting and securing the brackets at circumferentially spaced locations about such a planting;
    b) each of the brackets including an attached projection having a mounting portion extending outwardly from the attached bracket and extending outwardly from an associated trunk of a planting when the apparatus is in use;
    c) a plurality of elongate apertured support members each associated when in use with one of the brackets, the projection of the associated bracket projecting through an aperture of the associated support member when in use;
    d) a plurality of fasteners each associated with a different one of the projections for securing the associated projection and associated support member together when in use; and,
    e) the support members when in use to support a trunk of a planting each extending downwardly and outwardly from the associated projection to earth around the planting whereby to support the planting.

2. A support apparatus according to claim 1, characterised in that, the mounting brackets include openings through which the tie extends.

3. A support apparatus according to claim 1, characterised in that, a plurality of ties are provided.

4. A support apparatus according to claim 3, characterized in that, the ties (24) automatically lock tight.

5. A support apparatus according to claim 1, characterised in that a bracket is provided for each elongate member.

6. A support apparatus according to claim 5, characterised in that, each elongate member is removably mountable on the associated projection.

7. A support apparatus according to claim 5, characterised in that, each elongate member is pivotally mountable on the associated projection.

8. A support apparatus according to claim 1, characterised in that, each projection (20) is threaded.

9. A support apparatus according to claim 8, characterised in that, each fastener is a threaded member engageable with the associated projection to hold the respective associated elongate member thereon.

10. A support apparatus according to claim 9, characterised in that, each threaded member comprises a wing nut.

11. A support apparatus according to claim 1, characterised in that, three elongate members are provided.

12. A support apparatus according to claim 1, characterised in that, the elongate members are variable in length.

13. A support apparatus according to claim 12, characterised in that, the elongate members (32, 60, 72) are telescopic.

14. A support apparatus according to claim 13, characterised in that, a plurality of holes (40) is provided in one part (34) of the elongate members (32, 60, 72) alignable with a hole (42) in another part of the elongate members (38), with locking means (44) engageable in the aligned holes.

* * * * *